(12) United States Patent
Proctor et al.

(10) Patent No.: US 6,279,967 B1
(45) Date of Patent: Aug. 28, 2001

(54) DUCT JOINING SYSTEM

(75) Inventors: John P. Proctor, 44 Glen Dr., Fairfax, CA (US) 94930; Robert C. deKieffer, Boulder, CO (US)

(73) Assignee: John P. Proctor, Boulder, CO (US)

( * ) Notice: Subject to any disclaimer, the term of this patent is extended or adjusted under 35 U.S.C. 154(b) by 0 days.

(21) Appl. No.: 09/223,044

(22) Filed: Dec. 30, 1998

(51) Int. Cl.$^7$ .................................................. F16L 21/00
(52) U.S. Cl. .............................................................. 285/340
(58) Field of Search ................................. 285/340, 242, 285/252, 253, 347, 379, 933, 94, 260, 345, 110, 321

(56) References Cited

U.S. PATENT DOCUMENTS

| | | | |
|---|---|---|---|
| D. 377,829 | 2/1997 | Andresen | D23/393 |
| D. 383,196 | 9/1997 | Sonden et al. | D23/262 |
| 1,873,590 | * 8/1932 | James | 285/231 |
| 2,561,884 | * 7/1951 | Perrow | 285/231 |
| 2,916,306 | * 12/1959 | Rickard | 285/110 |
| 3,201,150 | * 8/1965 | Aydelott | 285/110 |
| 3,304,104 | * 2/1967 | Wiltse | 285/321 |
| 3,441,655 | * 4/1969 | Turner | 285/260 |
| 3,445,120 | * 5/1969 | Barr | 285/231 |
| 3,510,140 | * 5/1970 | Hermann | 285/231 |
| 4,182,519 | * 1/1980 | Wilson | 285/231 |
| 4,186,932 | * 2/1980 | Emhardt | 285/345 |
| 4,288,115 | 9/1981 | Sullivan | 285/363 |
| 4,291,905 | 9/1981 | Schrock | 285/192 |
| 4,331,338 | 5/1982 | Caldwell et al. | 277/58 |
| 4,383,693 | 5/1983 | Heller | 277/204 |
| 4,441,723 | 4/1984 | Greenwald | 277/164 |
| 4,447,078 | 5/1984 | Jenkins | 285/331 |
| 4,509,778 | 4/1985 | Arnoldt | 285/406 |
| 4,558,892 | 12/1985 | Daw et al. | 285/331 |
| 4,819,972 | 4/1989 | Champa et al. | 285/331 |
| 4,836,585 | 6/1989 | Schauer | 285/363 |
| 4,930,815 | 6/1990 | Tuggler, Jr. | 285/158 |
| 5,125,226 | 6/1992 | Sperinck | 60/39.092 |
| 5,127,680 | * 7/1992 | Takei | 285/94 |
| 5,195,789 | 3/1993 | Walsh et al. | 285/331 |
| 5,334,092 | 8/1994 | Binzer | 454/369 |
| 5,407,122 | 4/1995 | Stefansson et al. | 228/212 |
| 5,618,142 | 4/1997 | Sonden et al. | 411/29 |
| 5,649,662 | 7/1997 | Krichau et al. | 228/128 |
| 5,687,996 | * 11/1997 | Steinmetz | 285/242 |
| 5,697,651 | 12/1997 | Fernandes | 285/94 |
| 5,801,342 | 9/1998 | Hultberg et al. | 181/224 |
| 5,813,705 | * 9/1998 | Dole | 285/321 |
| 6,113,155 | 9/2000 | Beirens . | |

FOREIGN PATENT DOCUMENTS

| | | | |
|---|---|---|---|
| 0147961 | * 4/1981 | (DE) | 285/110 |
| 0106715 | * 7/1965 | (NO) | 285/110 |

* cited by examiner

Primary Examiner—Lynne H. Browne
Assistant Examiner—Aaron Dunwoody
(74) Attorney, Agent, or Firm—Skjerven Morrill MacPherson LLP

(57) ABSTRACT

A duct joining system for providing an air-tight seal and mechanical connection for ducts and fittings is disclosed. The duct joining system includes a flexible gasket affixed to a male end of a duct or fitting. The flexible gasket is affixed at an angle relative to normal of the male end of the duct. The female end of the other duct includes a raised bead in which the flexible gasket is seated when the ducts are properly joined. The angled flexible gasket seated in the raised bead forms an air-tight seal as well as fastens or locks the male end to the female end. Alternatively, when a flexible duct is used, a band clamp with a raised bead is clamped over the female end of the flexible duct and over the male end of a fitting to provide an air tight seal and fastened connection.

21 Claims, 3 Drawing Sheets

DUCT JOINING SYSTEM

"This invention was made with Government support under contract number DE-AC03-76SF00098 awarded by the United States Department of Energy and CRADA BG-97-352-01. The Government has certain rights in this invention."

FIELD OF THE INVENTION

The present invention relates to a duct joining system, and more particularly to a duct joining system that provides an air-tight seal and that fastens the ducts together.

BACKGROUND

Air ducts, such as that used with central furnaces and air conditioning units and the like, are typically made from sheet metal or a plastic flexible material having cylindrical, rectangular, or other cross sections as are well known in the art. The ducts are conventionally joined by sliding an end of one duct into an end of another duct and fastening and sealing the joint with duct tape, fasteners and/or other sealants. Often ducts are joined to one another or to an air conditioner/heater unit or a vent using a fitting in a similar manner.

Unfortunately, over time the seal fails and air is permitted to escape from the duct joint. In many cases the mechanical connection is partially or fully broken. Thus, air from the duct system leaks into areas of the building where the air is neither intended nor desired, such as in the attic, basement, or between the walls. Consequently, the energy that was used to heat or cool the escaped air, in addition to the energy used to move the escaped air, is wasted.

Attempts to prevent the unintentional leakage of air from duct joints include placing a gasket between the two ducts. While gaskets prevent air from leaking out of the duct joints, the ducts still require some fastening mechanism to prevent the ducts from slipping apart during installation as well as over time. Thus, it is good practice to securely fasten the joints of a duct together, and in fact the Uniform Mechanical Code §602.4 requires a mechanical connection between joints. Sheet metal screws or other similar fasteners are sometimes used to prevent partial or complete disconnection of the ducts and to meet the requirements of the Uniform Mechanical Code. However, the installation of the duct system requires holding ducts in place while fastening the joints, which can be awkward and time consuming and is often simply not done, particularly when the installer is uninformed or is in a hurry. Consequently, many duct joints are held together with nothing more than duct tape, which quickly fails permitting partial or complete disconnection of the ducts.

Thus, there is a need for a duct joining system that quickly and easily fastens and seals ducts together to form an air-tight conduit.

SUMMARY

A duct joining system for providing an air-tight and mechanical connection includes a flexible gasket affixed to a male end of a first duct at an angle relative to normal of the male end of the duct. The female end of a second duct includes a raised bead in which the flexible gasket is seated when the ducts are properly joined together. The angled flexible gasket seated in the raised bead forms an air-tight seal as well as fastens or locks the joints together.

A stop bead on the first duct prevents the male end from being inserted too far into the female end. Thus, the ducts may be joined by simply inserting the male end into the female end until the female end contacts the stop bead. The male end also includes an indented portion near the flexible gasket to accommodate the flexible gasket while the male end is inserted into the female end. Thus, the flexible gasket will not interfere with the insertion of the first duct into the second duct.

A band clamp with a raised bead may be used to clamp the female end of a duct, particularly a flexible duct, over the male end of the first duct. The flexible gasket is thus seated in the raised bead along with the flexible duct, thereby forming an air-tight seal and a fastened connection.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 1:
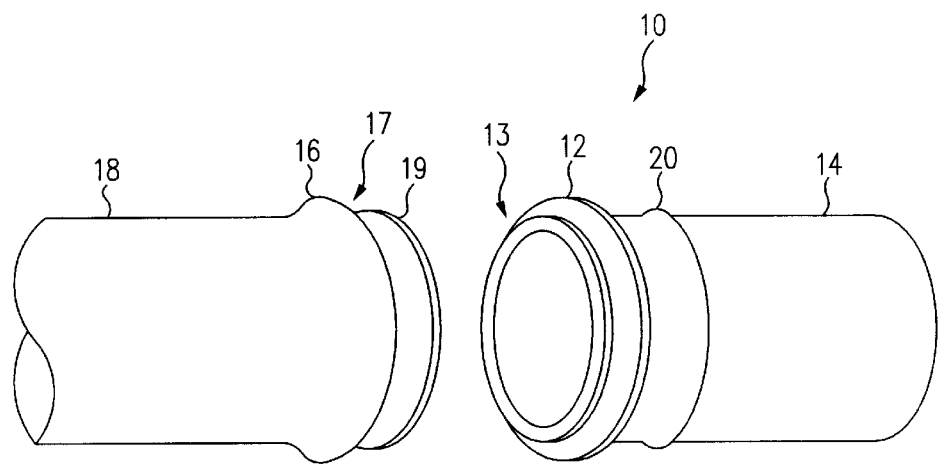
FIGS. 1 and 2 show perspective views of two ducts separated and joined together, respectively, with a duct joining system in accordance with an embodiment of the present invention.
Figure 2:
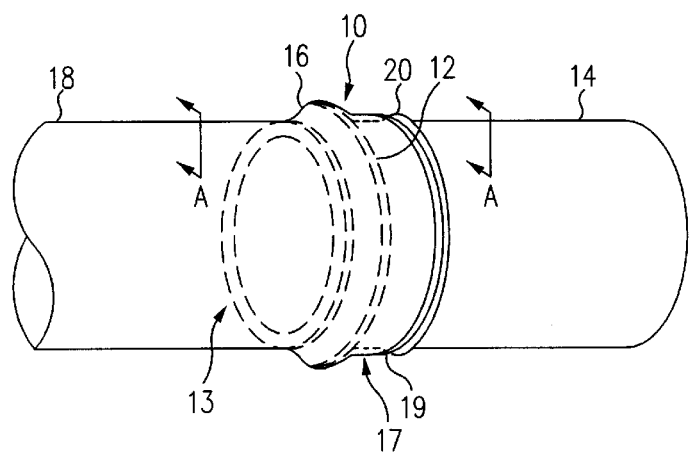

FIGS. 1 and 2 show perspective views of ducts 14 and 18 separated and joined together, respectively, with duct joining system 10, in accordance with an embodiment of the present invention. It should be understood that duct joining system 10 can be used with fittings as well as ducts. As is well understood in the art, fittings, such as elbow bends and boots, are similar to ducts, but are typically used to connect one duct to another duct or to an input/output device, e.g., an air conditioner/heater unit or vent. The terms "duct" and "fitting" may be used interchangeably for purposes of the present disclosure.

Duct joining system 10 includes a flexible gasket 12 at one end (the male end 13) of a duct 14 and a raised bead 16 near one end (the female end 17) of another duct 18. It should be understood that a single duct, e.g., duct 14, will typically include a male end 13 at one end (shown in FIGS. 1 and 2) and a female end 17 at the other end (not shown in FIGS. 1 and 2 for the sake of clarity). As shown in FIGS. 1 and 2, both flexible gasket 12 and raised bead 16 substantially extend around the perimeter of male end 13 and female end 17, respectively. A lead-in, which is in the form of an angled lip 19, is also included substantially extending around the circumference of the end of female end 17 to ease insertion of the male end 13 into female end 17 and to prevent damage to flexible gasket 12 during insertion. A stop bead 20 prevents male end 13 from being inserted too far into female end 17. Once properly joined, flexible gasket 12, shown in FIG. 2 by dotted lines, is seated in raised bead 16, thereby creating an air-tight seal between ducts 14 and 18. Moreover, because flexible gasket 12 is seated in raised bead 16, ducts 14 and 18 are mechanically fastened together.

Thus, advantageously, no additional fasteners are required with duct joining system 10.

While FIGS. 1 and 2 show ducts 14 and 18 as round, it should be understood that the shape illustrated in FIGS. 1 and 2 is exemplary and that any shaped ducts may be joined using duct joining system 10, including but not limited to oval, rectangular, square, and flexible ducts. Moreover, duct joining system 10 may be used with any size ducts.

Figure 3:
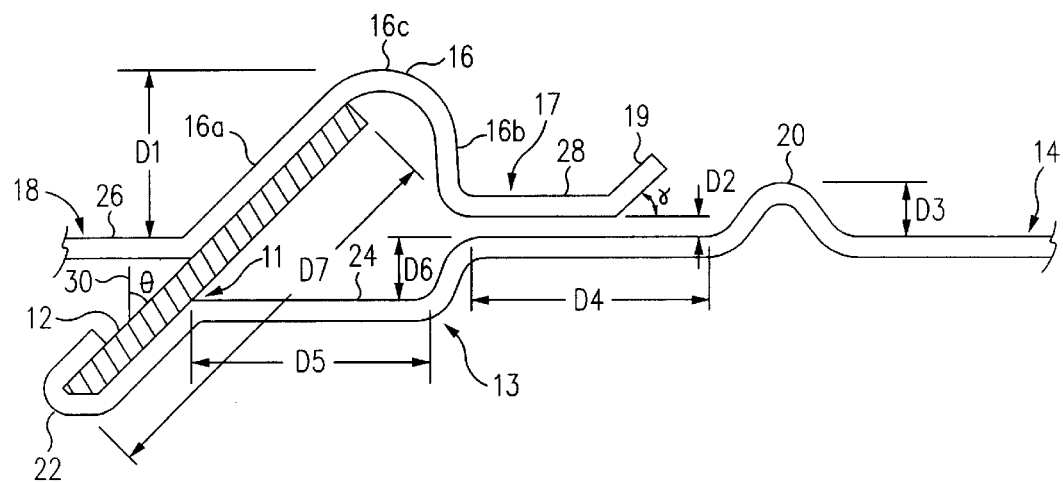
FIG. 3 is a cut-away side view of the duct joining system shown in FIG. 2.

FIG. 3 is a cut-away side view of duct joining system 10 along lines A—A, shown in FIG. 2. As male end 13 is inserted into female end 17, angled lip 19 at the terminal end of female end 17 acts as a lead-in to ease insertion and to prevent female end 17 from damaging flexible gasket 12. Stop bead 20 prevents male end 13 from being inserted too far into female end 17. Once male end 13 is inserted into female end 17, flexible gasket 12 is seated in raised bead 16, as illustrated in FIG. 3. While flexible gasket 12 can be made of rubber, soft plastic or some similar type material, the term "flexible gasket" should be understood to include any gasket that flexes, bends, or is hinged. Thus, for example, flexible gasket 12 may be made of stiff sheet metal or plastic that is hinged at point 11, shown in FIG. 3. The hinged flexible gasket 12 would be made of overlying flaps with each flap hinged at point 11. The hinge permits flexible gasket 12 to bend during insertion of male end 13 into female end 17. A hinged flexible gasket 12 may be biased, e.g., with a spring, to open and engage raised bead 16 once male end 13 is properly inserted into female end 17. Raised bead 16 may be made of or contain a flexible or soft material, e.g., rubber or some similar material, in which a flexible gasket 12 seats to create a seal.

It should be understood that angled lip 19 is an exemplary form of a lead-in and that other lead-ins may be used, including but not limited to completely rolling over the terminal end of female end 17. Moreover, a lead-in may not be used if desired.

FIG. 3 shows flexible gasket 12 affixed to male end 13 at an angle by a rolled end joint 22, in accordance with an embodiment of the present invention. Rolled end joint 22 rolls over and pinches flexible gasket 12 securely affixing flexible gasket 12 to male end 13. It should be understood that there are a variety of methods that may also be used to affix flexible gasket 12 to male end 13. For example, only small portions or fingers of male end 13 may be used to hold flexible gasket 12. Alternatively, a flexible gasket 12 may be attached to a retainer, which holds flexible gasket 12 at the desired angle. The retainer is then connected to the end of male end 13, thereby obviating the need to form rolled end joint 22. Other methods of affixing flexible gasket 12 to male end 13 will be apparent to those of ordinary skill in the art in light of the present disclosure.

Adjacent to rolled end joint 22 and flexible gasket 12 is an indented portion 24 of male end 13. Indented portion 24 permits flexible gasket 12 to be flattened out during insertion of male end 13 into female end 17. Thus, flexible gasket 12 does not interfere with the insertion of male end 13 into female end 17.

Raised bead 16 on female end 17 is configured to permit flexible gasket 12 to be seated when ducts 14 and 18 are properly joined. By way of an example, as shown in FIG. 3, raised bead 16 is configured with a relatively gradually sloping sidewall 16a and a sharply sloping sidewall 16b. The gradually sloping sidewall 16a of raised bead 16 forms approximately the same angle relative to female end 17 as formed by flexible gasket 12 relative to inserting end 13. Thus, when flexible gasket 12 is seated in raised bead 16, a relatively air-tight seal is formed between flexible gasket 12 and raised bead 16. If desired flexible gasket 12 may be longer than shown in FIG. 3, such that when flexible gasket 12 is seated in raised bead 16 flexible gasket presses against the top portion 16c of raised bead 16 and/or may press against sidewall 16b. Thus, flexible gasket 12 may press against any single sidewall 16a, 16b, or 16c or combination thereof. Further, the configuration of raised bead 16 may be altered if desired. Thus, sidewalls 16a and 16b may have the same or similar angles, may have concave, convex, or a combination of curvatures, and may have different relative dimensions than those shown in FIG. 3.

Flexible gasket 12 and raised bead 16 form a fastened joint between male end 13 and female end 17. Once flexible gasket 12 is seated in raised bead 16, an attempt to separate male end 13 from female end 17 will cause flexible gasket 12 to press against sidewall 16b. Because flexible gasket 12 is held at an angle, removal of male end 13 from female end 17 will be met with resistance. Thus, ducts 14 and 18 are fastened or locked together by duct joining system 10. The amount of resistance in removing male end 13 from female end 17 may be controlled by changing the materials, dimensions and angles of flexible gasket 12 as well as altering the dimensions of raised bead 16 and the amount of clearance between male end 13 and female end 17, i.e., dimension D2 shown in FIG. 3. Incidentally, these parameters may also effect the resistance in inserting male end 13 into female end 17 to achieve a good seal.

It should be understood that the particular dimensions and materials used in the duct joining system 10 may be varied as desired, but should be appropriate for the particular size and desired use of the ducts. Nevertheless, by way of an example, ducts 14 and 18 may be 6 inch outside diameter pipes made of conventional 26 gauge galvanized sheet metal, which is approximately 0.018 inches thick. The raised bead 16 on female end 17 is raised approximately 0.25 inches from an inside portion 26 of duct 18 (shown as dimension D1), giving raised bead 16 an outside diameter of approximately 6.56 inches. The terminal portion 28 of female end 17 has an outside diameter of approximately 6.13 inches and there is a separation of approximately 0.06 inches (shown as dimension D2) between the interior of terminal portion 28 and the outside diameter of duct 14, which is 6 inches. The angled lip 19 is approximately 45 degrees from horizontal (angle $\gamma$).

Stop bead 20 is raised approximately 0.13 inches above the 6 inch outside diameter of duct 14 (shown as dimension D3). The distance between stop bead 20 and indented portion 24 is approximately 0.35 inches (shown as dimension D4), but this dimension may be altered as long as flexible duct 12 and raised bead 16 are properly aligned. Indented portion 24 is approximately 1.44 inches long (shown as dimension D5) and approximately 0.08 inches deep (shown as dimension D6). It should be understood that indented portion 24 should be deep enough and long enough to accommodate flexible gasket 12. Rolled end joint 22 has an inside diameter of approximately 5.44 inches. It should be understood, however, that the inside diameter of rolled end joint 22 contributes to the resistance of air flow through the joined ducts. Thus, it may be desirable to reduce the resistance to air flow by using a smaller end joint 22 that forms a larger inside diameter.

Flexible gasket 12 is approximately 0.63 inches long (shown as dimension D7) and 0.06 inches thick. Flexible gasket 12 is held at an angle of approximately 45 degrees (shown as angle $\theta$) with respect to the normal (shown as line 30) of duct 14. Sloping sidewall 16a of raised bead 16 has approximately the same 45 degree angle.

Flexible gasket 12 is made of rubber, flexible plastic, or some similar type material. By way of an example, flexible gasket 12 is made from EPDM rubber, manufactured by Bay Rubber Company, located in Oakland, Calif. Flexible gasket 12 may be a molded sheet of material, such as rubber, that has an outside diameter of 5.96 inches with a hole in the center with an inside diameter of 5.52 inches. If duct 14 had a shape other than circular, e.g., oval, square, or rectangular, flexible gasket 12 would have a comparable shape and a hole in the center also with a comparable shape. Flexible gasket 12 is slid onto male end 13 and rolled end joint 22 is formed to secure flexible gasket 12 to duct 14. Flexible gasket 12 may also be formed using a flat piece of gasket material. Rolled end joint 22 is formed pinching the gasket material to form the conical configuration of flexible gasket 12, shown in FIG. 3, such that the two ends of the gasket material are placed proximate to each other. The ends of the gasket material, once affixed to male end 13 need not be glued together.

The sheet metal of ducts 14 and 18 may be bent and shaped to form duct joining system 10 using conventional sheet metal shaping methods, such as rolling, stamping, folding, or any other appropriate techniques. If ducts 14 and 18 are made of other material, duct joining system 10 may be formed using conventional methods for that particular material. For example, if ducts 14 and 18 were made of plastic, duct joining system 10 may be formed using molding or other plastic fabrication techniques.

Figure 4:
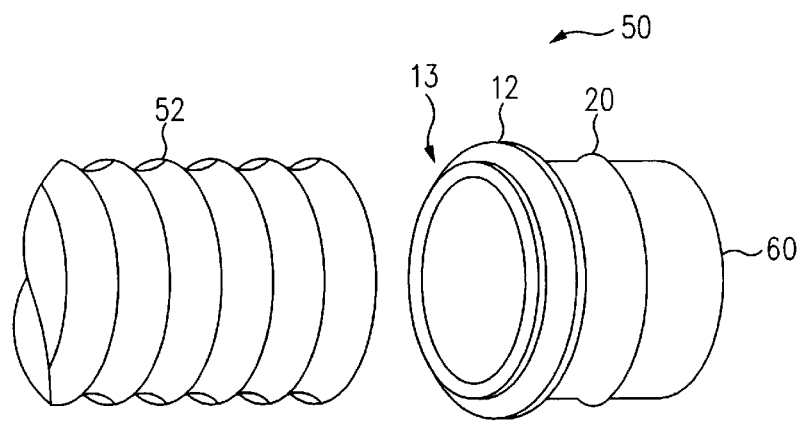
FIGS. 4 and 5 show perspective views of a flexible duct and a fitting separated and joined together, respectively, with a duct joining system in accordance with another embodiment of the present invention.
Figure 5:
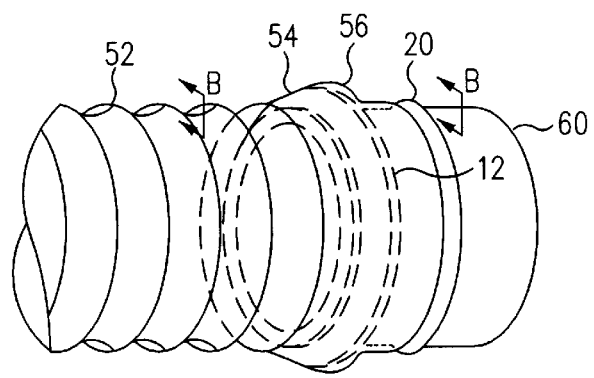

FIGS. 4 and 5 show perspective views of a fitting 60 and a duct 52 separated and joined together, respectively, with duct joining system 50 in accordance with another embodiment of the present invention.

Duct joining system 50 is similar to duct joining system 10 shown in FIGS. 1, 2, and 3, like designated elements being the same. However, duct joining system 50 includes a fitting 60, which is similar to duct 14 shown in FIGS. 1, 2, and 3, and includes a male end 13 with a flexible gasket 12 and a stop bead 20. Duct joining system 50 also includes a flexible duct 52 that, as shown in FIG. 4, does not have a raised bead. Flexible duct 52 may be made from plastic, rubber, cloth, or similar type material and may include a helical supporting wire. It should be understood that flexible duct 52 typically includes an overlying layer of insulation and another overlying layer serving as a vapor barrier. The overlying insulation layer and vapor barrier layers are not shown on flexible duct 52 for the sake of clarity.

Fitting 60 may be used to join flexible duct 52 to an input or output device, such as an air conditioner/heater unit or a vent. Fitting 60 may also be used to join two flexible ducts 52 together, in which case, fitting 60 will include another male end in mirror image to male end 13. Two flexible ducts 52 may then be joined end to end using a fitting 60 with two male ends 13.

As shown in FIG. 5, duct joining system 50 includes a band clamp 54 that is used to hold flexible duct 52 securely on fitting 60 once flexible duct 52 is slipped over fitting 60. In another embodiment, band clamp 54 is not used with duct joining system 50. The resistance provided by angled flexible gasket 62 pressing against flexible duct 52 is sufficient to fasten flexible duct 52 to fitting 60.

Figure 6:
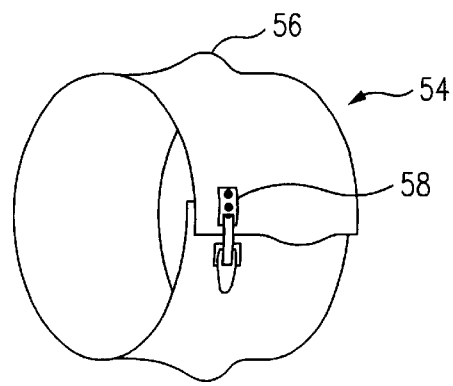
FIG. 6 is a perspective view of a band clamp used with the duct joining system shown in FIGS. 4 and 5.

FIG. 6 is a perspective view of band clamp 54. Band clamp 54 includes a raised bead 56, which is similar to raised bead 16, shown in FIG. 3. In addition, band clamp 54 includes a fastening mechanism 58 to tighten band clamp 54. FIG. 6 shows an over-center toggle type clamp device that may be spot welded or pop-riveted onto band clamp 54. However, it should be understood that other types of fastening mechanisms may be used, including a worm screw, tie wraps, or any other appropriate mechanism. Band clamp 54 may be made of plastic, sheet metal, or any other appropriate material and may be formed in a manner similar to that described for female end 17 shown in FIG. 3. When duct joining system 50 is used to join two flexible ducts together, i.e., fitting 60 has two opposing male ends, either two band clamps 54 may be used or one band clamp that has two raised beads 56 in mirror image to accommodate the two male ends 13 may be used.

Figure 7:
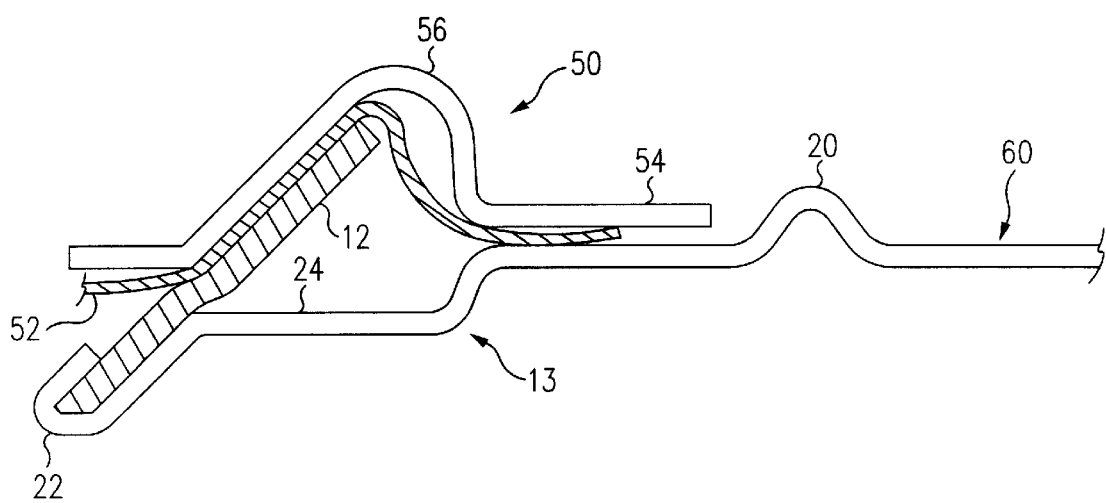
FIG. 7 is a cut-away side view of the duct joining system shown in FIG. 5.

FIG. 7 is a cut-away side view of duct joining system 50 along lines B—B shown in FIG. 5. As shown in FIG. 7, once male end 13 is inserted into flexible duct 52, flexible gasket 12 is seated within flexible duct 54 creating an air-tight seal. In addition, band clamp 52 may be used to clamp flexible duct 52 against flexible gasket 12 to increase the seal as well as to prevent flexible duct 52 from slipping off male end 13. Stop bead 20 on fitting 60 may be used to properly align band clamp 54 over flexible duct 52 and fitting 60.

Although the present invention has been described in considerable detail with reference to certain versions thereof, other versions are possible. For example, other materials, shapes, and dimensions may be used than those illustrated. Therefore, the spirit and scope of the appended claims should not be limited to the description of the versions depicted in the figures.

What is claimed is:

1. A duct joining system comprising:
    a first duct having a male end and a flexible gasket coupled to said male end; and
    a second duct having a female end, said male end sliding into said female end, said second duct also having a raised bead on said female end, said raised bead being formed by at least two opposing sidewalls, said flexible gasket seats in said raised bead to form a seal with said female end and to fasten said male end to said female end.

2. The duct joining system of claim 1, wherein said flexible gasket is held at a first angle relative to normal of said male end and said first angle of said flexible gasket when seated in said raised bead resists removal of said male end from said female end to fasten said male end to said female end.

3. The duct joining system of claim 2, said raised bead comprising a sidewall having a second angle relative to normal of said female end.

4. The duct joining system of claim 3, wherein said first angle and said second angle are approximately the same.

5. The duct joining system of claim 2, said second duct further comprising a terminal portion between the terminal end of said female end and one side of said raised bead, said terminal portion having a first outside diameter, said second duct further comprising an inside portion on the other side of said raised bead, said inside portion having a second outside diameter, said first outside diameter being greater than said second outside diameter.

6. The duct joining system of claim 5, said terminal end of said second duct is a lead-in.

7. The duct joining system of claim 6, wherein said lead-in is an angled lip.

8. The duct joining system of claim 2, wherein said flexible gasket and said raised bead substantially extend around the respective perimeters of said first duct and said second duct.

9. A duct joining system comprising:
    a first duct comprising a male end and a flexible gasket coupled to said male end;

a second duct comprising a female end, said male end sliding into said female end, said flexible gasket forming a seal with said female end, said second duct is a flexible duct; and a band clamp, said band clamp placed over said female end and said male end and clamps said first duct and said second duct together, said band clamp comprising a raised bead, said flexible gasket is seated in said second duct and said raised bead to form said seal with said female end and to fasten said male end to said female end.

10. The duct joining system of claim 9, wherein said band clamp further comprises a fastening mechanism.

11. The duct joining system of claim 10, wherein said fastening mechanism is an over-center clamp device.

12. The duct joining system of claim 1, said first duct further having a stop bead, said stop bead preventing said male end from being inserted too far into said female end.

13. The duct joining system of claim 1, said male end further comprising an indented portion adjacent to said flexible gasket, said indented portion configured to accommodate said flexible gasket during insertion of said male end into said female end.

14. The duct joining system of claim 1, wherein one of said first duct and said second duct is a fitting.

15. An apparatus comprising:

a first duct;

a flexible gasket;

means for affixing said flexible gasket to said first duct at an angle relative to the normal of said first duct; and a second duct having a raised bead being formed by at least two opposing sidewalls;

wherein a portion of said first duct is inserted into a portion of said second duct and said flexible gasket seats in said raised bead and provides a seal and a mechanical connection between said first duct and said second duct.

16. The apparatus of claim 15, said second duct having a raised bead into which said flexible gasket is seated to form said seal and said mechanical connection when said portion of said first duct is inserted into said portion of said second duct.

17. The apparatus of claim 15, further comprising a band clamp, wherein said band clamp is clamped over said portion of said second duct and said portion of said first duct, said band clamp assists in providing said seal and said mechanical connection.

18. The apparatus of claim 17, wherein said second duct is a flexible duct, and said band clamp having a raised bead into which a second portion of said second duct and said flexible gasket is seated.

19. The apparatus of claim 15, wherein said means for affixing comprises a rolled end joint on said first duct that holds said flexible gasket at said angle.

20. A duct joining system comprising:

a first duct having a male end;

a second duct having a female end, said male end of said first duct being inserted into said female end; and means for mechanically fastening and sealing said first duct to said second duct, said means for mechanically fastening and sealing coupled to said first duct and said second duct and including a flexible gasket and a bead being formed by at least two opposing sidewalls in which said flexible gasket is seated when said male end is inserted into said female end.

21. The duct joining system of claim 20, wherein said means for mechanically fastening and sealing said first duct to said second duct comprises said flexible gasket coupled to said male end and said bead on said female end, wherein said flexible gasket is seated in said bead to form a seal between said first duct and said second duct and to resist removal of male end from female end.

* * * * *